Figure 1:
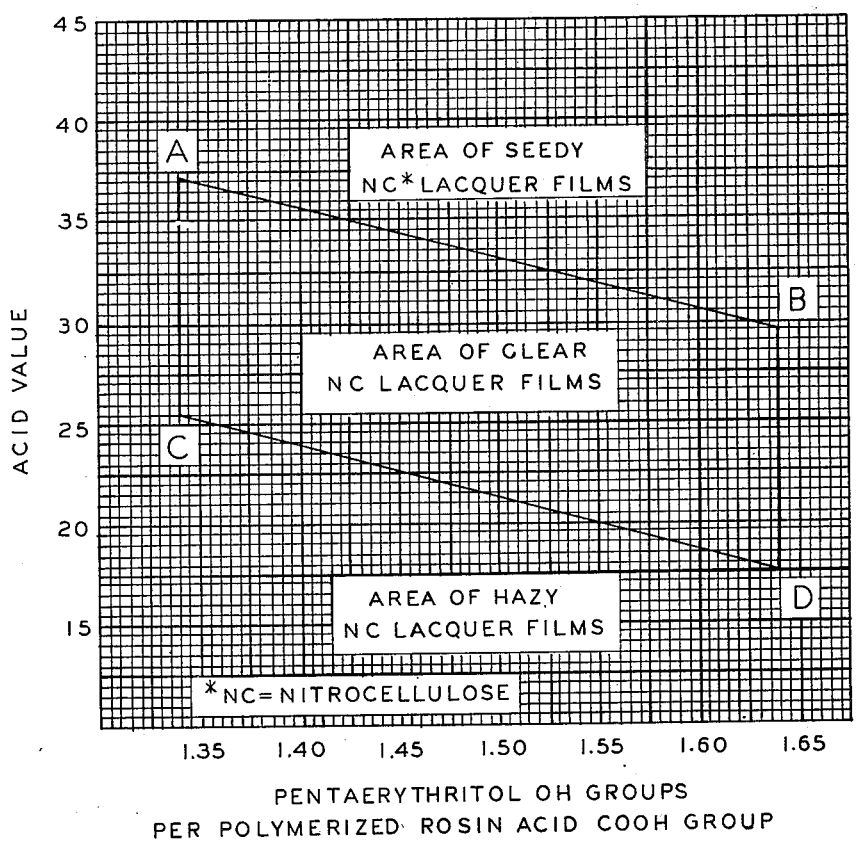

Jan. 2, 1951  A. E. RHEINECK  2,536,091
NITROCELLULOSE COMPATIBLE RESINS DERIVED FROM A PENTAERYTHRITOL,
POLYMERIZED ROSIN AND AN ALPHA-BETA UNSATURATED
POLYCARBOXYLIC ACID AND METHOD FOR PREPARATION
Filed March 25, 1947

ALFRED E. RHEINECK
*INVENTOR.*

BY Ernest G. Peterson
AGENT

Patented Jan. 2, 1951

2,536,091

UNITED STATES PATENT OFFICE 2,536,091

NITROCELLULOSE COMPATIBLE RESINS DERIVED FROM A PENTAERYTHRITOL, POLYMERIZED ROSIN AND AN ALPHA-BETA UNSATURATED POLYCARBOXYLIC ACID AND METHOD FOR PREPARATION

Alfred E. Rheineck, Wilmington, Del., assignor to Hercules Powder Company, Wilmington, Del., a corporation of Delaware Application March 25, 1947, Serial No. 736,911

8 Claims. (Cl. 260—26)

This invention relates to hard resins derived from a pentaerythritol, an alpha-beta unsaturated dicarboxylic acid and a polymerized rosin acid and to methods for the preparation thereof.

It is known to produce esters of a pentaerythritol, an alpha-beta unsaturated dicarboxylic acid and a polymerized rosin acid. Such esters are characterized by great hardness, high melting point, good heat stability and solubility in drying oils, see U. S. 2,322,197 to F. G. Oswald and U. S. 2,344,194 to G. R. Anderson. In some respects these esters constitute an improvement over esters derived from glycerol, an alpha-beta unsaturated dicarboxylic acid and a polymerized rosin acid. It is also known to use such esters in the preparation of oleoresinous varnishes and in lacquers. However, despite the fact that the pentaerythritol esters contribute desirable properties to such compositions, it is well known that the resins derived from pentaerythritol have an objectionable characteristic when used in nitrocellulose lacquers. The coatings or films resulting from such compositions evidence an incompatibility of the ingredients which is variously described as seediness, graininess or haziness.

Seediness or graininess can be observed by viewing in the direction of a source of light a dried film held horizontally at near eye level. The phenomenon is manifested as small specks spread uniformly throughout the film. Haziness may be observed by viewing the film against a dark background and is manifested as a smoky or milky condition.

In accordance with this invention, it has been found that hard resinous esters can be prepared from a pentaerythritol, an alpha-beta unsaturated dicarboxylic acid and a polymerized rosin acid which are truly compatible with nitrocellulose and which may be used in nitrocellulose lacquer formulations to provide perfectly clear lacquer films. It has been found that such esters can be prepared by observing certain critical factors relating to the type and proportions of ingredients and to the acid value of the final ester. Thus, it is required that there be employed in the esterification an excess of pentaerythritol over and above that theoretically required to completely esterify the dicarboxylic acid and the polymerized rosin acid. More specifically, the pentaerythritol is employed in an amount sufficient to provide the amount required stoichiometrically to completely esterify the dicarboxylic acid and to provide in addition from 1.34 to 1.64 pentaerythritol hydroxyl groups for each carboxyl group of the polymerized rosin acid. It is further required that the unsaturated dicarboxylic acid be employed in the amount of from 0.037 to 0.188 mol per mol of rosin acid (assuming the acidic component of the polymerized rosin acid to be entirely unpolymerized rosin acid).

To obtain the desired nitrocellulose compatible esters the esterification reaction is stopped at a point such that the acid value of the finished ester is within the range which is productive of nitrocellulose compatibility. This acid value range is variable and is a function of both the proportion of alpha-beta unsaturated dicarboxylic acid to rosin acid and the pentaerythritol hydroxyl excess as defined in the paragraph immediately preceding. This can be seen more clearly from an inspection of Figure 1. Figure 1 constitutes a graphic representation of the acid value compatibility ranges which obtain when the mols of dicarboxylic acid per mol of rosin acid is held constant (about 0.037) and the pentaerythritol hydroxyl excess, as defined in the paragraph immediately preceding, varied. Thus, at 1.34 pentaerythritol hydroxyls per carboxyl group of the polymerized rosin acid, the acid value range productive of nitrocellulose compatibility is from about 25.5 to about 37, whereas at 1.64 pentaerythritol hydroxyls per carboxyl group of the polymerized rosin acid, the acid value range productive of nitrocellulose compatibility is from about 17.5 to about 29.5. The position of the line CD of area ABCD changes somewhat with variation in the proportion of dicarboxylic acid to rosin acid, it being generally somewhat lower as the proportion of dicarboxylic acid to rosin acid is increased and somewhat higher as the proportion is decreased. The slope of the line CD, however, remains substantially constant. Also, the line AB changes position somewhat as the proportion of dicarboxylic acid to rosin acid is varied. Within the limits of the invention as described, however, the maximum acid value at which truly nitrocellulose compatible resins can be achieved is about 40 whereas the minimum value is about 15.

There is another factor which must be taken into account, and this has to do with the particular type of pentaerythritol employed. Pentaerythritol is made commercially by the condensation of acetaldehyde and formaldehyde. Along with the pentaerythritol monomer formed, there are formed comparatively small amounts of related hydroxylated substances. One of these compounds, dipentaerythritol, is an ether having the following structure:

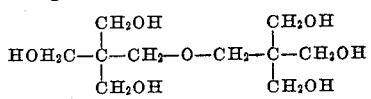

Another related compound, tripentaerythritol, is formed in even smaller amounts. According to the best evidence, it is believed to have the following structural formula:

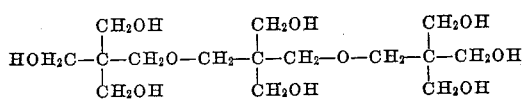

Dipentaerythritol, tripentaerythritol and higher ethers of pentaerythritol may be grouped together under the generic term "polypentaerythritols." This term is employed herein to mean those compounds having higher molecular weights than pentaerythritol monomer which are formed actually or theoretically by etherifying one or more of the hydroxyl groups of pentaerythritol monomer with other pentaerythritol molecules. The monomer, dimer, trimer, etc. of pentaerythritol refer to simple pentaerythritol, dipentaerythritol and tripentaerythritol, respectively.

In accordance with this invention, the pentaerythritol employed in making the desired resins may be either substantially pure pentaerythritol monomer or pentaerythritol monomer-polypentaerythritol mixtures which contain at least 50% of pentaerythritol monomer and have a hydroxyl content of at least 40%. Preferably, the pentaerythritol employed will contain from 70 to 90% pentaerythritol monomer and will have a hydroxyl content of at least 42%. Resins cannot be prepared from a material which is substantially 100% polypentaerythritols, i. e., resins having the property of compatibility with nitrocellulose to the extent that perfectly clear lacquer films can be prepared therefrom. Hazy films are always obtained. Furthermore, the presence of a large amount of polypentaerythritols having a molecular weight higher than that of dipentaerythritol appears to preclude the attainment of nitrocellulose compatibility in the resulting resin. For that reason, there is the minimum hydroxyl content limitation on the material which can be employed.

In connection with the determination of the proper proportions of polymerized rosin acid and a particular pentaerythritol and the proper proportions of polymerized rosin acid and alpha-beta unsaturated dicarboxylic acid to employ in accordance with this invention, it is necessary to briefly discuss the nature of polymerized rosin acid. When rosin is subjected to the various treatments known to the art to effect polymerization, the unsaturated rosin acids are believed to react with each other through the double bonds to form polymers. This reaction does not involve any products of elimination, and hence the resulting molecule has a molecular weight which is a multiple of that of the unsaturated rosin acid. It is believed that the dipolymer is the highest polymer formed. Hence, a rosin, after subjection to polymerization treatment, contains a certain proportion of the dipolymer of rosin acids and a certain proportion of unpolymerized rosin acids, in addition to whatever neutral bodies may be present. It is convenient for the purpose of calculating the proper proportions of the ingredients used in accordance with this invention to assume the acidic components of the polymerized rosin acid to be entirely unpolymerized rosin acid. Hence, it will be understood that the rosin acid content of a polymerized rosin acid refers to the rosin acid content based on this assumption.

To determine the proper proportions of polymerized rosin acid and a particular pentaerythritol to employ, it is desirable to first determine the hydroxyl content of the pentaerythritol by the acetylation method. The combining or equivalent weight of the pentaerythritol, i. e., that amount theoretically needed to completely esterify 1 mol of rosin acid (302 parts) or ½ mol of dicarboxylic acid, is given by the following formula:

$$\text{Combining weight} = \frac{17 \times 100}{\text{Per cent hydroxyl content of pentaerythritol}}$$

The amount of pentaerythritol theoretically required to completely esterify the dicarboxylic acid employed can be easily computed. The amount of pentaerythritol required to provide the desired number of pentaerythritol hydroxyl groups per carboxyl group of the polymerized rosin acid can be obtained by multiplying the combining weight of the pentaerythritol by the desired number of pentaerythritol hydroxyl groups per carboxyl groups of the polymerized rosin acid and then multiplying this product by the number of mols of rosin acid to be employed. The sum of these two amounts of pentaerythritol represents the total amount of pentaerythritol required.

Having now indicated in a general way the nature and purpose of the invention, there follows a more detailed description of specific embodiments of the invention.

*Example 1*

| | Parts |
|---|---|
| Polymerized wood rosin | 1000 |
| Pentaerythritol | 147.5 |
| Maleic anhydride | 10.0 |

The polymerized wood rosin employed had a drop melting point of 102° C. and an acid value of 152. Hence, the rosin acid content amounted to about 82% or 820 parts. On this basis, there were 2.715 mols of rosin acid present. The pentaerythritol was a technical grade material containing about 83% pentaerythritol monomer and having a hydroxyl content of about 46.0%. The combining weight of the pentaerythritol was 37. The amount of pentaerythritol employed was accordingly sufficient to provide the amount required stoichiometrically to completely esterify the maleic anhydride and to provide in addition 1.39 pentaerythritol hydroxyl groups for each carboxyl group of the polymerized rosin. The maleic anhydride employed amounted to 0.037 mol per mol of rosin acid.

The polymerized rosin was heated with the maleic anhydride to 200° C. and held at this temperature for 30 minutes. Then the pentaerythritol was added with vigorous mechanical agitation. The mass was heated to 280° C. and held at that temperature for one hour with continued agitation. Mechanical agitation was then discontinued and a gentle stream of $CO_2$ was passed through the reaction mixture while maintaining a temperature of 280° C. Samples were taken at intervals as esterification progressed. It was found that the ester samples having acid values of from 24.5 to 35 (determined using phenolphthalein indicator on the esters after they had cooled to room temperature) were compatible with ½ sec. R. S. nitrocellulose at ester to nitrocellulose ratios of from 1.5–1.0 to 4.0–1.0. Lacquers containing these ingredients in the indicated proportions provided lacquer films which were perfectly clear and evidenced no seediness or haziness. Esters having an acid value above 35 were found to give seedy films with nitrocellulose whereas esters having an acid value below 24.5 were found to give hazy films with nitrocellulose.

*Example 2*

| | Parts |
|---|---|
| Polymerized wood rosin | 1000 |
| Maleic anhydride | 10.0 |
| Pentaerythritol | 157.5 |

The same types of polymerized rosin and pentaerythritol were employed as in Example 1. The same proportion of maleic anhydride to rosin acid was employed. The amount of pentaerythritol employed, however, was sufficient to provide the amount required stoichiometrically to completely esterify the maleic anhydride and to provide in addition 1.49 pentaerythritol hydroxyl groups for each carboxyl group of the polymerized rosin.

The method employed in esterifying the ingredients was substantially identical with that of Example 1. It was found that ester samples having acid values of from 21 to 34 (determined using phenolphthalein indicator on the esters after they had cooled to room temperature) were compatible with ½ sec. R. S. nitrocellulose at ester to nitrocellulose ratios of from 1.5–1.0 to 4.0–1.0. Lacquers containing these ingredients in the indicated proportions provided lacquer films which were perfectly clear and evidenced no seediness or haziness. Esters having an acid value above 34 were found to give seedy films with nitrocellulose whereas esters having an acid value below 21 were found to give hazy films with nitrocellulose.

*Example 3*

| | Parts |
|---|---|
| Polymerized wood rosin | 1000 |
| Maleic anhydride | 10.0 |
| Pentaerythritol | 167.5 |

The same types of polymerized rosin and pentaerythritol were employed as in Example 1. The same proportions of maleic anhydride to rosin acid was employed. The amount of pentaerythritol employed, however, was sufficient to provide the amount required stoichiometrically to completely esterify the maleic anhydride and provide in addition 1.59 pentaerythritol hydroxyl groups for each carboxyl group of the polymerized rosin. Substantially the same esterification conditions obtained as in Example 1. It was found that ester samples having acid values of from 19 to 30 were compatible with ½ sec. R. S. nitrocellulose at ester to nitrocellulose ratios of from 1.5–1.0 to 4.0–1.0. Esters having an acid value above 30 were found to give seedy films with nitrocellulose whereas esters having an acid value below 19 were found to give hazy films with nitrocellulose.

*Example 4*

| | Parts |
|---|---|
| Polymerized wood rosin | 1000 |
| Maleic anhydride | 10.0 |
| Pentaerythritol | 142.5 |

The same types of polymerized rosin and pentaerythritol were employed as in Example 1. The same proportion of maleic anhydride to rosin acid was employed. The amount of pentaerythritol employed, however, was sufficient to provide the amount required stoichiometrically to completely esterify the maleic anhydride and to provide in addition 1.34 pentaerythritol hydroxyl groups for each carboxyl group of the polymerized rosin.

Substantially the same esterification conditions obtained as in Example 1. Esterification was continued until an ester having an acid value of 37 resulted. It was found to be completely compatible with ½ sec. R. S. nitrocellulose at ester to nitrocellulose ratios of from 1.5–1.0 to 4.0–1.0.

*Example 5*

| | Parts |
|---|---|
| Polymerized wood rosin | 1000 |
| Maleic anhydride | 10.0 |
| Pentaerythritol | 172.5 |

The same types of polymerized rosin and pentaerythritol were employed as in Example 1. The same proportions of maleic anhydride to rosin acid was employed. The amount of pentaerythritol employed, however, was sufficient to provide the amount required stoichiometrically to completely esterify the maleic anhydride and to provide in addition 1.64 pentaerythritol hydroxyl groups for each carboxyl group of the polymerized rosin.

Employing the same esterification conditions as in Example 1, a hard resin was obtained having an acid value of 22.5. It was found to be completely compatible with ½ sec. R. S. nitrocellulose at ester to nitrocellulose ratios of from 1.5–1.0 to 4.0–1.0.

*Example 6*

| | Parts |
|---|---|
| Polymerized wood rosin | 1000 |
| Maleic anhydride | 20.0 |
| Pentaerythritol | 165.0 |

The same types of polymerized rosin and pentaerythritol were employed as in Example 1. The maleic anhydride employed amounted to 0.074 mol per mol of rosin acid. The amount of pentaerythritol employed was sufficient to provide the amount required stoichiometrically to completely esterify the maleic anhydride and to provide in addition 1.49 pentaerythritol hydroxyl group for each carboxyl group of the polymerized rosin.

Employing substantially the same esterification conditions as in Example 1, it was found that ester samples having acid values of from 18 to 33 were compatible with ½ sec. R. S. nitrocellulose at ester to nitrocellulose ratios of from 1.5–1.0 to 4.0–1.0.

*Example 7*

| | Parts |
|---|---|
| Polymerized wood rosin | 1000 |
| Maleic anhydride | 30 |
| Pentaerythritol | 162.5 |

The same types of polymerized rosin and pentaerythritol were employed as in Example 1. The maleic anhydride employed amounted to 0.111 mol per mol of rosin acid. The amount of pentaerythritol employed was sufficient to provide the amount required stoichiometrically to completely esterify the maleic anhydride and to provide in addition 1.39 pentaerythritol hydroxyl group for each carboxyl group of the polymerized rosin.

Employing substantially the same esterification conditions as in Example 1, it was found that ester samples having acid values of from 19 to 32 were compatible with ½ sec. R. S. nitrocellulose at ester to nitrocellulose ratios of from 1.5–1.0 to 4.0–1.0.

*Example 8*

|  | Parts |
|---|---|
| Polymerized wood rosin | 1000 |
| Maleic anhydride | 40.0 |
| Pentaerythritol | 190.0 |

The same types of polymerized rosin and pentaerythritol were employed as in Example 1. The maleic anhydride employed amounted to 0.150 mol per mol of rosin acid. The amount of pentaerythritol employed was sufficient to provide the amount required stoichiometrically to completely esterify the maleic anhydride and to provide in addition 1.59 pentaerythritol hydroxyl group for each carboxyl group of the polymerized rosin.

Employing substantially the same esterification conditions as in Example 1, it was found that ester samples having acid values of from 15 to 33 were compatible with ½ sec. R. S. nitrocellulose at ester to nitrocellulose ratios of from 1.5–1.0 to 4.0–1.0.

Attempts were made to prepare esters from polymerized wood rosin, an alpha-beta unsaturated dicarboxylic acid and substantially pure dipentaerythritol using various proportions of dipentaerythritol and polymerized rosin acid, i. e., within the range of 1.34 to 1.64 pentaerythritol hydroxyl groups per polymerized rosin acid hydroxyl group. In no case was it possible to produce a truly nitrocellulose compatible resin. Similar attempts to produce nitrocellulose compatible esters from a technical polypentaerythritol, consisting of dipentaerythritol and a substantial quantity of polypentaerythritols having a molecular weight higher than that of dipentaerythritol, failed.

In preparing the subject resinous esters, it is necessary to employ a polymerized rosin acid. By this term, it is meant to include rosin acids which have been polymerized by one of the various methods known to the art such as, for example, by treatment with various catalysts, as sulfuric acid, boron trifluoride, stannic chloride, zinc chloride, aluminum chloride, hydrofluoric acid, etc. or by treatment of the rosin acid with a high voltage, high frequency electrical discharge, or by treatment with an acid sludge formed by treatment of rosin acid with sulfuric acid. The polymerization of a rosin acid by any of these methods is usually carried out with the rosin acid dissolved in a suitable organic solvent such as benzene, gasoline, etc. The starting material may be any rosin acid-containing material such as the various grades of wood or gum rosin, rosin acids obtainable therefrom, specific rosin acids as abietic, l-primaric, sapinic, etc. acids, etc.

The polymerized rosin acids used in accordance with this invention are characterized by having higher melting points than the rosin acids from which they are derived. Thus, polymerized rosin acids having melting points by the Hercules Drop Method of from about 90° C. to about 135° C. may be used in preparing the subject resinous esters. It is furthermore preferred that the polymerized rosin acid have a melting point by the Hercules Drop Method of from 95 to 115° C.

It is apparent from the examples that either technical grades of pentaerythritol, pentaerythritol monomer or synthetic mixtures of pentaerythritol monomer and polypentaerythritols may be employed in accordance with this invention. Regardless of which material is employed, however, it is required that it shall contain at least 50% of pentaerythritol monomer and have a hydroxyl content of at least 40%. The preferred grade of pentaerythritol employed as a starting material is one containing from 70 to 90% pentaerythritol monomer and having a hydroxyl content of at least 42%. Included within this preferred classification are the so-called technical or resin grade pentaerythritols available commercially. Such technical or resin grade pentaerythritols frequently contain a small amount of metal compounds, the metal being introduced as catalyst or as impurities in the reactants. For the purpose of this invention it is preferred that the pentaerythritol employed be substantially free of such metal compounds, i. e., that the mineral ash content, determined as the sulfate, of the pentaerythritol employed be not greater than 0.30%.

Any alpha-beta unsaturated dicarboxylic acid such as maleic acid, fumaric acid, itaconic acid, citraconic acid, etc. may be employed in carrying out this invention. Similarly, the anhydrides of these acids may be employed and are to be regarded as true equivalents. Acids having 8 carbon atoms or less are preferred. Particularly preferred is maleic acid since it is available commercially and produces very desirable resins when used in accordance with this invention.

As mentioned previously, the proportion of alpha-beta unsaturated dicarboxylic acid to rosin acid is critical. If substantially more than 0.188 mol of dicarboxylic acid per mol of rosin acid is employed, gellation is often encountered in preparing the resin. At 0.188 mol of dicarboxylic acid per mol of rosin acid, the acid value compatability band is quite wide. As the proportion of the dicarboxylic acid to rosin acid is decreased, however, the band decreases in width, this showing that addition of the dicarboxylic acid has the effect of broadening the acid value compatibility band. 0.037 mol of dicarboxylic acid per mol of rosin acid (the lower end of the critical range) represents the minimum amount of dicarboxylic acid which can be employed while at the same time achieving this broadening effect. In other words, in adding the dicarboxylic acid to a pentaerythritol-polymerized rosin acid system, 0.037 mol of the dicarboxylic acid per mol of rosin acid is the point at which the broadening effect becomes substantial.

The acid value compatibility ranges, which obtain when from 0.037 to 0.075 mol of dicarboxylic acid per mol of rosin acid is employed, are fairly represented graphically by Figure 1. Thus, Figure 1 is not only representative of conditions which obtain when 0.037 mol of dicarboxylic acid per mol of rosin acid is employed, but it is also a substantially accurate representation for operations involving the range of 0.037 to 0.075.

The general methods of esterification used in applying the principles of this invention are those known to the art for esterifying pentaerythritol, an alpha-beta unsaturated dicarboxylic acid and a polymerized rosin acid. Thus, an esterification temperature of at least 260° C. should be used. At the same time, the temperature should not be permitted to go above the temperature of decomposition of the reactants or the reaction product. A temperature of from 270° C. to 290° C. is preferred. The order of adding the ingredients is not particularly critical. It is preferred, however, to first heat the dicarboxylic acid and polymerized rosin acid together at a temperature of 190–230° C. for a period of from 15 minutes to 1 hour. The pentaerythritol is then added and the temperature raised to at least 260° C. If desired, all the ingredients may be heated together simultaneously. However, it is preferred to use the step-wise procedure wherever more than 0.132 mol of alpha-beta unsaturated dicarboxylic acid per mol of rosin acid is employed.

During the esterification, a gentle stream of inert gas such as $CO_2$, $N_2$, etc. may be passed through the reaction mixture. Heating is discontinued at a point such that the product after cooling to room temperature has an acid value (using phenolphthalein indicator) in the acid value compatibility range which applies for the particular conditions at hand. This acid value will in every instance fall in the over-all range of 15 to 40 as explained previously. During the period of cooling of the ester from the esterification temperature to room temperature the acid value may drop by as much as 10 points and the extent of this drop in acid value is dependent upon the conditions under which the cooling is effected.

During the esterification reaction some of the reactants may be lost by distillation. Although these losses are generally slight, it is important to keep them at a very minimum. If the proportion of reactants originally employed is not maintained, it will be obvious that the acid value compatibility range which normally would apply will not obtain. To prevent such losses of ingredients or to keep such losses to a minimum, it is best not to sparge the resins during preparation. However, as illustrated by the examples, the use of a gentle stream of inert gas such as $N_2$, $CO_2$, etc. to agitate the ingredients may be advantageously employed. Losses of ingredients can also be minimized by maintaining considerable free space between the top of the reaction vessel and the surface of the reaction mixture or by employing a suitable condenser. In this manner, water of esterification can be removed while retaining substantially all the reactants.

Resinous esters prepared in accordance with this invention are truly compatible with nitrocellulose in the ester to nitrocellulose ratios of from 1.5–1.0 to 4.0–1.0. Lacquers comprising the ingredients in these proportions deposit films which are perfectly clear and do not exhibit seediness, graininess or haziness. Generally speaking, the lacquers themselves are also perfectly clear. In some cases, a slight cloudiness or haziness can be detected in the lacquer. Even in these cases, however, the resulting films evidence complete compatibility. Although in the examples the resins were tested for compatibility using ½ sec. R. S. nitrocellulose, the compatibility of the resins of this invention is not limited to compatibility with those particular types of nitrocellulose. The resins are compatible with the various types and grades of nitrocellulose used commercially in nitrocellulose lacquer formulations.

The resinous esters prepared in accordance with this invention are unique in that they possess nitrocellulose compatibility. This property is basically new in the field of resinous esters prepared from a pentaerythritol, an alpha-beta unsaturated dicarboxylic acid and polymerized rosin. At the same time, these resins provide additional advantages when used in nitrocellulose lacquer formulations. The lacquer films deposited from such lacquers possess excellent cold check resistance and have excellent sanding properties. In both respects, these resins represent substantial improvements over the resins used heretofore in nitrocellulose lacquers, particularly the resins derived from glycerol, an alpha-beta unsaturated dicarboxylic acid and polymerized rosin.

Where in the specification and claims reference is made to pentaerythritol monomer content of a pentaerythritol, it will be understood that determination by the dibenzal method is meant. This method involves the following steps. Prepare a benzaldehyde-methanol reagent by adding 100 ml. of anhydrous methanol to 20 ml. of benzaldehyde. Add 5 ml. of water to a dry sample of the pentaerythritol (0.35–0.55 gram) contained in an Erlenmeyer flask. Heat the 5 ml. solution to boiling, add 15 ml. of the benzaldehyde-methanol reagent, and mix these solutions well. Add 12 ml. concentrated HCl and shake the reaction mixture. Allow the reaction mixture to stand for 5 minutes with occasional swirling while the greater part of the precipitate of pentaerythritol dibenzal forms and then place the flask in an ice bath for 1 hour. Dilute the reaction mixture with 25 ml. of ice cold methanol-water solution (1:1 by vol.) and filter through a weighed fritted glass crucible. Wash the precipitate free from benzaldehyde with 100 ml. water solution (1:1 by vol.) at a temperature of 20–25° C. Dry the precipitate to constant weight at 120° C. (about 2 hours). The pentaerythritol monomer is calculated using the following formula in which 0.0269 represents a correction value for the solubility of the pentaerythritol dibenzal.

$$\frac{(\text{Grams precipitate} + 0.0269)\ 43.60}{\text{Grams sample}} =$$

Per cent pentaerythritol monomer

Where in the specification and claims reference is made to acid value, it will be understood that the phenolphthalein method for determining acid value is meant. This method involves the following steps. Dissolve about 3 grams of the resin in 15 ml. of toluene. Add 50 ml. of a neutral alcohol-benzene solution (1:1 by vol.) and titrate the resulting solution with 0.5 N NaOH or KOH using phenolphthalein indicator to a permanent endpoint.

Where in the specification and claims reference is made to the hydroxyl value of a pentaerythritol, it will be understood that determination by the acetylation method is meant. This method involves the following steps. Prepare an acetic anhydride-pyridine solution by adding exactly 3.5 ml. water to 1000 ml. dry pyridine. After mixing, add 140 ml. acetic anhydride to make the reagent approximately 2.4 N. Weigh 0.5 to 0.6 gram of dry pentaerythritol into a 250 ml. Erlenmeyer flask. Add 25 ml. of the pyridine-acetic anhydride reagent from a constant delivery pipette. Attach the flask to a condenser and reflux gently for 30 minutes. Flush the condensers with 30–50 ml. of water, cool the flask for 20 minutes in tap water to below 20° C. and titrate at once with 1.0 N NaOH using phenolphthalein indicator. Add the NaOH slowly (about 15–20 ml. per minute) until within 10 ml. of the endpoint and from then on add the NaOH dropwise. Determine the concentration of the pyridine-acetic anhydride reagent by making a blank determination on 25 ml. under the above conditions. The hydroxyl content is calculated using the following formula wherein A is the ml. NaOH used to titrate the blank, B is the ml. NaOH used to titrate the sample and N.F. is the normality factor of the NaOH:

$$\frac{1.7(A-B)N.F.}{\text{Grams sample}} = \text{Percent hydroxyl}$$

All melting points in the specification and claims are those as determined by the Hercules Drop Method unless otherwise stated.

All parts and percentages in the specification and claims are by weight unless otherwise stated.

What I claim and desire to protect by Letters Patent is:

1. The process for preparing a hard nitrocellulose compatible resin from a pentaerythritol, an alpha-beta unsaturated dicarboxylic acid and a polymerized rosin acid which comprises reacting said ingredients under esterifying conditions until a resin having nitrocellulose compatibility and having an acid value from 15 to 40 is obtained, said pentaerythritol being selected from the group consisting of pentaerythritol monomer and pentaerythritol monomer-polypentaerythritol mixtures which contain at least 50% of pentaerythritol monomer and which have a hydroxyl content of at least 40%, said pentaerythritol being employed in an amount sufficient to provide the amount required stoichiometrically to completely esterify the dicarboxylic acid and to provide in addition from 1.34 to 1.64 pentaerythritol hydroxyl groups for each carboxyl group of the polymerized rosin acid, said alpha-beta unsaturated dicarboxylic acid being employed in the amount of from 0.037 to 0.188 mol per mol of rosin acid (assuming the acidic component of the polymerized rosin acid to be entirely unpolymerized rosin acid), the unsaturation of the said alpha, beta-unsaturated dicarboxylic acid being ethylenic in nature and the said alpha, beta-unsaturated dicarboxylic acid having no substituents other than carboxyl groups reactive under the conditions employed.

2. The process for preparing a hard nitrocellulose compatible resin from a pentaerythritol, an alpha-beta unsaturated dicarboxylic acid and a polymerized rosin acid which comprises reacting said ingredients under esterifying conditions until a resin having nitrocellulose compatibility and having an acid value from 15 to 40 is obtained, said pentaerythritol being selected from the group consisting of pentaerythritol monomer and pentaerythritol monomer-polypentaerythritol mixtures which contain at least 50% of pentaerythritol monomer and which have a hydroxyl content of at least 40%, said pentaerythritol being employed in an amount sufficient to provide the amount required stoichiometrically to completely esterify the dicarboxylic acid and to provide in addition from 1.34 to 1.64 pentaerythritol hydroxyl groups for each carboxyl group of the polymerized rosin acid, said alpha-beta unsaturated dicarboxylic acid being employed in the amount of from 0.037 to 0.188 mol per mol of rosin acid (assuming the acidic component of the polymerized rosin acid to be entirely unpolymerized rosin acid), said polymerized rosin acid having a melting point of from 90° C. to 135° C., the unsaturation of the said alpha, beta-unsaturated dicarboxylic acid being ethylenic in nature and the said alpha, beta-unsaturated dicarboxylic acid having no substituents other than carboxyl groups reactive under the conditions employed.

3. The process for preparing a hard nitrocellulose compatible resin from a pentaerythritol, an alpha-beta unsaturated dicarboxylic acid and a polymerized rosin acid which comprises reacting said ingredients under esterifying conditions until a resin having nitrocellulose compatibility and having an acid value from 15 to 40 is obtained, said pentaerythritol being a pentaerythritol monomer-polypentaerythritol mixture containing from 70-90% pentaerythritol monomer and having a hydroxyl content of at least 42%, said pentaerythritol being employed in an amount sufficient to provide the amount required stoichiometrically to completely esterify the dicarboxylic acid and to provide in addition from 1.34 to 1.64 pentaerythritol hydroxyl groups for each carboxyl group of the polymerized rosin acid, said alpha-beta unsaturated dicarboxylic acid being employed in the amount of from 0.037 to 0.188 mol per mol of rosin acid (assuming the acidic component of the polymerized rosin acid to be entirely unpolymerized rosin acid), said polymerized rosin acid having a melting point of from 90° C. to 135° C., the unsaturation of the said alpha, beta-unsaturated dicarboxylic acid being ethylenic in nature and the said alpha, beta-unsaturated dicarboxylic acid having no substituents other than carboxyl groups reactive under the conditions employed.

4. The process for preparing a hard nitrocellulose compatible resin from pentaerythritol monomer, an alpha-beta unsaturated dicarboxylic acid and a polymerized rosin acid which comprises reacting said ingredients under esterifying conditions until a resin having nitrocellulose compatibility and having an acid value from 15 to 40 is obtained, said pentaerythritol monomer being employed in an amount sufficient to provide the amount required stoichiometrically to completely esterify the dicarboxylic acid and to provide in addition from 1.34 to 1.64 pentaerythritol hydroxyl groups for each carboxyl group of the polymerized rosin acid, said alpha-beta unsaturated dicarboxylic acid being employed in the amount of from 0.037 to 0.188 mol per mol of rosin acid (assuming the acidic component of the polymerized rosin acid to be entirely unpolymerized rosin acid), said polymerized rosin acid having a melting point of from 90° C. to 135° C., the unsaturation of the said alpha, beta-unsaturated dicarboxylic acid being ethylenic in nature and the said alpha, beta-unsaturated dicarboxylic acid having no substituents other than carboxyl groups reactive under the conditions employed.

5. The process for preparing a hard nitrocellulose compatible resin from a pentaerythritol, maleic acid and a polymerized rosin acid which comprises reacting said ingredients under esterifying conditions until a resin having nitrocellulose compatibility and having an acid value from 15 to 40 is obtained, said pentaerythritol being a pentaerythritol monomer-polypentaerythritol mixture containing from 70-90% pentaerythritol monomer and having a hydroxyl content of at least 42%, said pentaerythritol being employed in an amount sufficient to provide the amount required stoichiometrically to completely esterify the maleic acid and to provide in addition from 1.34 to 1.64 pentaerythritol hydroxyl groups for each carboxyl group of the polymerized rosin acid, said maleic acid being employed in the amount of from 0.037 to 0.188 mol per mol of rosin acid (assuming the acidic component of the polymerized rosin acid to be entirely unpolymerized rosin acid), said polymerized rosin acid having a melting point of from 90° C. to 135° C.

6. The process for preparing a hard nitrocellulose compatible resin from pentaerythritol monomer, maleic acid and a polymerized rosin acid which comprises reacting said ingredients under esterifying conditions until a resin having nitrocellulose compatibility and having an acid value from 15 to 40 is obtained, said pentaerythritol monomer being employed in an amount sufficient to provide the amount required stoichiometrically to completely esterify the maleic acid and to provide in addition from 1.34 to 1.64 pentaerythritol hydroxyl groups for each carboxyl group of the polymerized rosin acid, said maleic acid being employed in the amount of from 0.037 to 0.188 mol per mol of rosin acid (assuming the acidic component of the polymerized rosin acid to be entirely unpolymerized rosin acid), said polymerized rosin acid having a melting point of from 90 C. to 135° C.

7. The process for preparing a hard nitrocellulose compatible resin from a pentaerythritol, maleic acid and a polymerized rosin acid which comprises reacting said ingredients under esterifying conditions until a resin having nitrocellulose compatibility and having an acid value from 15 to 40 is obtained, said pentaerythritol being selected from the group consisting of pentaerythritol monomer and pentaerythritol monomer-polypentaerythritol mixtures which contain at least 50% of pentaerythritol monomer and which have a hydroxyl content of at least 40%, said pentaerythritol being employed in an amount sufficient to provide the amount require stoichiometrically to completely esterify the maleic acid and to provide in addition from 1.34 to 1.64 pentaerythritol hydroxyl groups for each carboxyl group of the polymerized rosin acid, said maleic acid being employed in the amount of from 0.037 to 0.188 mol per mol of rosin acid (assuming the acidic component of the polymerized rosin acid to be entirely unpolymerized rosin acid), said polymerized rosin acid having a melting point of from 90° C. to 135° C.

8. The product of the process of claim 1.

ALFRED E. RHEINECK.

REFERENCES CITED

The following references are of record in the file of this patent:

UNITED STATES PATENTS

| Number | Name | Date |
| --- | --- | --- |
| 1,739,446 | Durr | Dec. 10, 1929 |
| 2,322,197 | Oswald | June 15, 1943 |
| 2,344,194 | Anderson | Mar. 14, 1944 |
| 2,399,692 | Peterson | May 7, 1946 |